INVENTORS
DAVID COOPER
EDWARD P. PRIEBE
RICHARD A. ZECCOLA
BY Joseph V. Claeys
THEIR ATTORNEY

INVENTORS
DAVID COOPER
EDWARD P. PRIEBE
RICHARD A. ZECCOLA
BY
THEIR ATTORNEY

United States Patent Office 3,335,349
Patented Aug. 8, 1967

3,335,349
SPEED DETECTION AND CONTROL SYSTEMS INCORPORATING A DC CHOPPER CIRCUIT TO PROVIDE PULSES OF A CONSTANT ENERGY CONTENT
David Cooper, Erie, Edward P. Priebe, North East, and Richard A. Zeccola, Erie, Pa., assignors to General Electric Company, a corporation of New York
Filed Aug. 17, 1964, Ser. No. 389,991
11 Claims. (Cl. 318—318)

ABSTRACT OF THE DISCLOSURE

In a system for measuring and/or controlling the speed of an object (such as a shaft or a vehicle), pulses whose repetition rate is proportional to the actual speed of the object are shaped to form pulses whose time duration does not exceed a predetermined maximum which pulses are then used to trigger a DC chopper circuit into operation to provide pulses having a constant energy content which are then averaged to provide an output potential which is proportional to the actual speed of the object.

Figure 1:
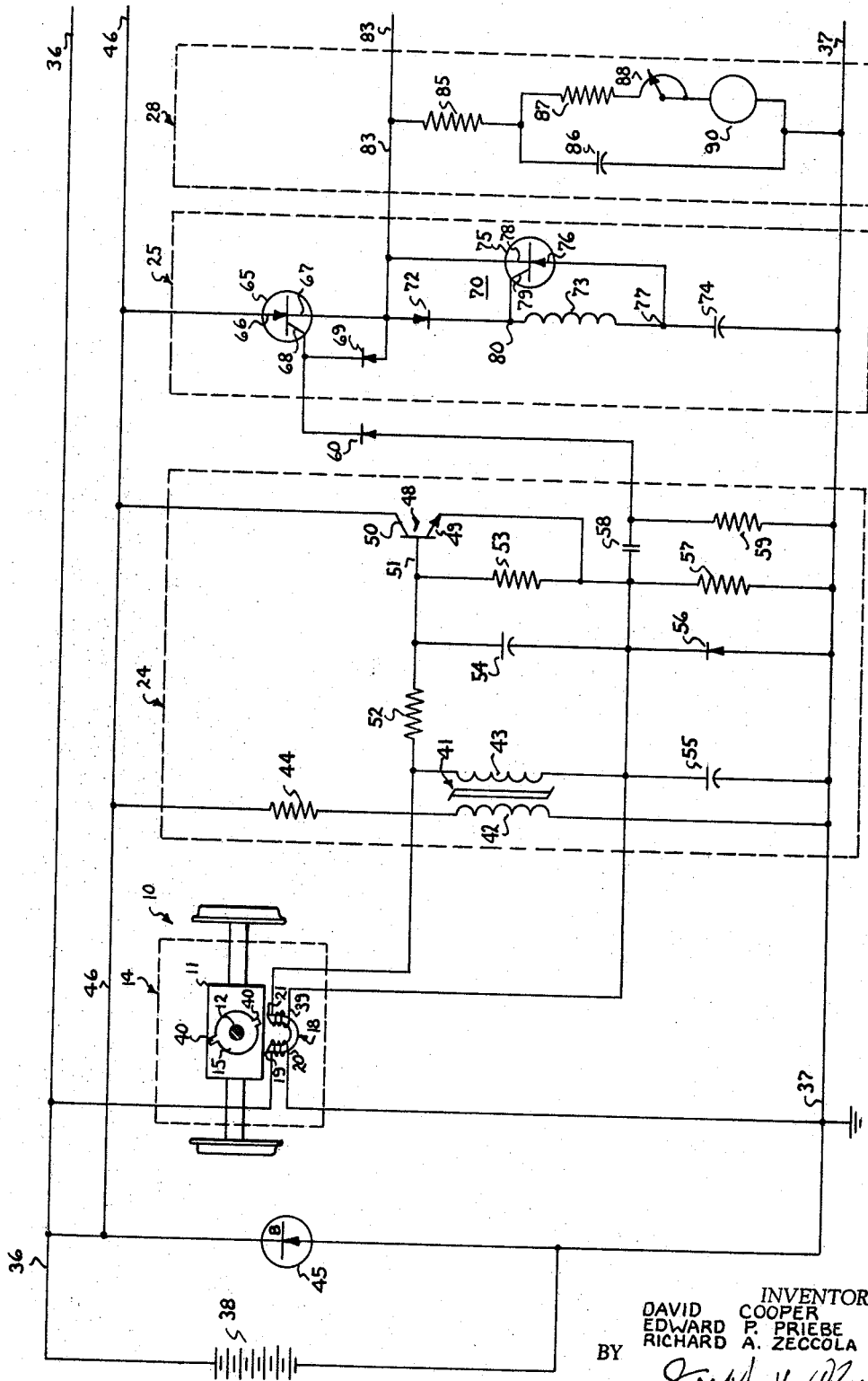

This invention relates to new and improved speed control systems and to novel speed detecting arrangements therefor. While this invention is subject to a wide range of applications, it is especially suited for use with rail vehicles, particularly rapid transit type vehicles, and will be described in detail in that connection.

The speed detecting and control systems widely used in rail vehicle applications in providing for speed indication, regulation, wheel adhesion loss detection and control, and the like usually employ an axle mounted and driven frequency generator. Such frequency generators are then utilized with associated apparatus to provide the desired speed detection and/or control function. While such systems have been satisfactory for many applications, heretofore, there is a continuing need to provide speed control and detecting systems with high reliability and low cost. More over, because of the severe vibrations encountered, reliable axle driven frequency generators are inherently relatively expensive. Further, being axle driven, such frequency generators sense speed at the axle only thereby allowing for the possibility of a slipped pinion gear, for example, without immediate detection. In addition, most rapid transit type vehicles do not readily permit of the use of axle mounted equipment, such as a frequency generator, for example.

It is an object of this invention, therefore, to provide a new and improved system for detecting and/or controlling the speed of an object which substantially overcomes one or more of the prior art difficulties and which is both inexpensive and highly reliable.

It is another object of this invention to provide a novel arrangement for deriving an extremely accurate signal proportional to the angular velocity of an object which is substantially independent of variations in the output characteristics of the sensing device associated with such object.

It is yet another object of this invention to provide a signal proportional to the speed of a vehicle which is simple, inexpensive, highly reliable and does not require the use of an axle driven frequency generator.

Briefly stated, in accordance with one aspect of this invention, the novel arrangement for deriving a signal proportional to speed of an object comprises means associated with the object for producing pulses having a rate of occurrence indicative of the speed of the object. The speed-indicating pulses so produced are then shaped to provide pulses which do not exceed a predetermined time duration and are utilized to trigger a circuit means which provides output pulses having both a fixed magnitude and time duration. The fixed magnitude and time duration output pulses so provided are applied to a pulse-averaging means to provide an output potential therefrom which is proportional to the speed of the object. This output potential may then be utilized to actuate a speed indicating device, such as a milliammeter, for example, and/or compared with a selected voltage reference indicative of a desired speed to provide speed regulation between preselected limits as well as providing for overspeed protection and other desired functions.

Figure 2:
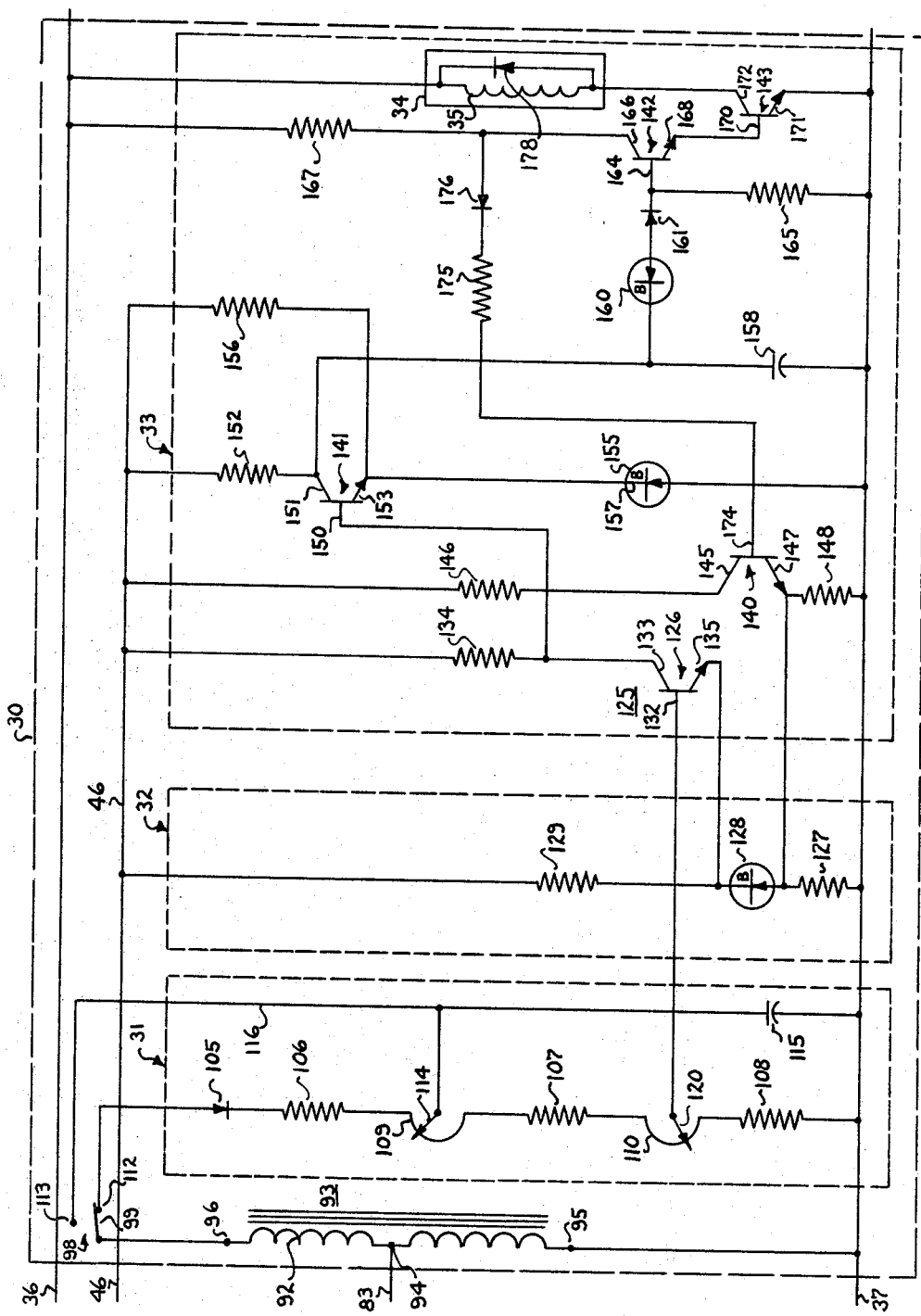

The novel features believed characteristic of this invention are set forth with particularly in the appended claims. The invention itself, however, together with further objects and advantages thereof, will best be understood by reference to the following description taken in connection with the accompanying drawing wherein:

FIGURES 1 and 2 when placed side by side provide a schematic circuit diagram of an embodiment of this invention which provides for speed detection, visual speed indication and speed regulation.

General

Referring now to FIGS. 1 and 2 of the drawing, there is shown, in diagrammatic form, a wheel and axle assembly 10 of a rail vehicle, which may be a rapid transit vehicle, for example. Wheel and axle assembly 10 is arranged to be driven in any suitable manner such as by the gear unit 11 connected via driveshaft 12 to a suitable traction motor (not shown).

The system also includes a speed-responsive means, designated generally at 14, for providing pulses the rate of occurrence of which is indicative of speed. As shown, speed-responsive means 14 includes a toothed wheel 15, rotatably associated with driveshaft 12, operating in a magnetic circuit provided by the U-shaped core member 18 and an excitation winding 20 therefor. Accordingly, speed-responsive means 14 provides pulses the rate of occurrence of which is indicative of the rotative speed of toothed wheel 15 and of the output shaft of the traction motor associated therewith as well. From the foregoing, it will be apparent that the output pulses of speed-responsive means 14 are indicative of the speed of the vehicle also.

The output of speed-responsive means 14 is applied to a pulse shaping and limiting means 24 which derives pulses not exceeding a predetermined maximum time duration from the varying time duration pulses of speed-responsive means 14. The output of pulse shaping and limiting means 24 is then applied to the input of circuit means 25, shown as a DC chopper, to signal the operation thereof. Circuit means 25 is adapted to produce an output pulse of fixed magnitude and time duration each time a pulse from shaping and limiting means 24 is applied to its input. The number of pulses produced by circuit means 25, therefore, is determined by the number of speed-indicative pulses produced by speed-responsive means 14. Accordingly, the average value of the voltage generated by circuit means 25 is proportional to the rotational speed of toothed wheel 15 and, therefore, related also to the speed of the vehicle and the traction motor. The output of circuit means 25 may then be conveniently converted into a signal proportional to speed by applying such output to a pulse-averaging means; the output of the pulse-averaging means being a potential proportional to the rotative speed of toothed wheel 15. By suitable calibration, this output signal may be made to indicate the speed of the vehicle, the speed of the traction motor or the like, and applied to various utilization means to provide a desired function.

Accordingly, the system is shown in FIG. 1 as providing for a visual speed indication by application of the output of circuit means 25 to speed-indicating means 28, and in FIG. 2 as providing for vehicle speed control by application of the output of circuit means 25 to speed-regulation means 30. For example, in FIG. 1 the output of circuit means 25 is shown applied to speed-indicating means 28 where it is suitably filtered and fed into a current measuring device, shown as a milliammeter 90, suitably calibrated to read vehicle speed directly. Further, the output of circuit means 25 is shown applied to the speed-regulation means 30, shown in FIG. 2, and including another filter 31, a voltage reference means 32 and an amplifier means 33. Speed-regulation means 30 is arranged so that when the output of the filter 31 exceeds the reference the resulting signal is amplified and applied to energize a suitable control means 34 for controlling the power applied to the vehicle. As shown schematically in FIG. 2, for example, control means 34 may include a control relay winding 35 which when energized is operative to de-energize the power circuit of the traction motors driving the vehicle.

The foregoing described system, therefore, is capable of providing a visual indication of speed as well as intelligence for regulating speed between selected limits, or providing protection for over-speed as well as a variety of other functions. The system also provides for sensing the speed of an object, such as a rapid transit vehicle for example, by sensing the rotational speed of the means, for example the traction motor, driving the object. Moreover, the accuracy of the speed signal produced is relatively independent of the accuracy, uniformity or wave shape of the output characteristic of the speed-responsive means utilized so that such speed-responsive means may take any of a wide variety of relatively inexpensive forms thereby avoiding the necessity for expensive axle driven devices. It will be apparent, therefore, that the system of this invention is extremely reliable as well as inexpensive and requires neither vibrating contacts nor axle mounted sensing devices.

*Speed responsive means*

Referring again to FIG. 1 for a more detailed description, speed-responsive means 14 is shown as being of the variable-reluctance type and includes the toothed wheel 15 rotatably associated with driveshaft 12. Toothed wheel 15 is arranged to operate in a magnetic circuit provided by the U-shaped core member 18 having legs 19 and 21. Leg 19 is provided with the excitation winding 20 which is connected over conductors 36 and 37 to a suitable source of potential, shown schematically as the battery 38. The leg 21 of core member 18 is provided with a pick-up winding 39.

In operation, as a tooth 40 of wheel 15 passes through the magnetic field set up by excitation winding 20, the flux in core member 18 is varied and a voltage is induced in pick-up winding 39. This induced voltage is in the form of a pulse with one positive and negative pulse being produced each time a tooth 40 passes through the magnetic field. Thus, the faster toothed wheel 15 rotates, the higher is the rate of occurrence of the pulses so that the pulses appearing on pick-up winding 39 are indicative of the angular velocity of toothed wheel 15, and hence of the speed of the traction motor and of the vehicle with which such traction motor is associated as well.

*Pulse shaping and limiting means*

The speed-indicative output pulses from speed-responsive means 14 are applied from pick-up winding 39 to pulse shaping and limiting means 24 where they are operated upon to provide pulses of one polarity and which do not exceed a predetermined maximum time duration. Thus, the output pulses are suitably shaped, amplified and time-duration-limited to assure proper signaling of circuit means 25 while at the same time preventing spurious signaling thereof.

To this end, shaping and limiting means 24 includes a core 41, which may be of any suitable magnetic material, but preferably of a material exhibiting substantially rectangular hysteresis characteristics, having windings 42 and 43 thereon. Winding 42 is connected through a suitable current limiting resistance 44 to a source of regulated voltage, shown as provided between conductors 46 and 37 by breakdown diode device 45 connected across battery 38. As is well known, breakdown diode devices have the characteristic of preventing current flow therethrough in the reverse direction until a predetermined voltage is applied across the device, whereupon breakdown occurs to permit current flow in the reverse direction. Winding 42 is adapted to provide a suitable bias for core 41 to return the core toward negative saturation in the absence of a signal on pick-up winding 39. Winding 43 is connected across pick-up winding 39 and is operative to saturate core 41 to thereby shunt down the signal on pick-up winding 39 a predetermined time after it appears. For example, in a particular case winding 43 may be arranged to saturate core 41 and shunt down the pick-up signal on pick-up winding 39 after a few microseconds. In this way, the output pulses from shaping and limiting means 24 will never exceed a time duration of such few microseconds. Thus, these output pulses will never exceed a predetermined maximum time duration regardless of the time duration of the speed-indicative pulses appearing on pick-up winding 39. Accordingly, spurious signaling to circuit means 25 is prevented since even at slow speeds, when a tooth 40 passes through the magnetic field slowly to produce a low magnitude, long time duration pulse, winding 43 is operative to limit the time duration of the signaling pulse to circuit means 25 to the predetermined maximum.

Shaping and limiting means 24 also includes an amplifier comprising transistor device 48 having an emitter electrode 49, a collector electrode 50, and a base electrode 51. The time duration limited speed-indicative pulse is coupled to the base electrode 51 of transistor device 48 through a filter circuit made up of resistances 52 and 53, capacitances 54 and 55 and diode device 56. Collector electrode 50 of transistor device 48 is connected to conductor 46, and the positive side of the regulated voltage source, while emitter electrode 49 is connected to conductor 37, and the negative side of such voltage source, through current limiting resistance 57. Emitter electrode 49 is also connected to conductor 37 via capacitance 58 and resistance 59 which provides a suitable DC decoupling circuit for applying the output pulses from circuit means 24 through a blocking diode device 60 to the input of circuit means 25.

*DC chopper*

Circuit means 25 provides an output pulse having a fixed magnitude and a fixed time duration every time a pulse from means 24 is applied thereto. This may be conveniently provided by a suitable DC chopper circuit, shown as including a first semiconductor controlled rectifier device 65 having an anode 66, a cathode 67 and a control electrode 68. A blocking diode 69 is connected in well known manner between cathode 67 and control electrode 68. Controlled rectifier device 65 conducts when a suitable positive voltage is applied to its control electrode as is well known, and is rendered nonconducting a fixed time thereafter by operation of a commutation circuit means 70. Commutation circuit means 70 includes diode device 72, an inductance 73 and a capacitance 74 connected in series combination with the anode-cathode elements of controlled rectifier device 65 across the regulated voltage source provided by breakdown diode 45. The commutation circuit also includes a second controlled rectifier device 75 having its anode 76 connected to the junction 77 between inductance 73 and capacitance 74 and its cathode 78 connected to the cathode 67 of controlled rectifier device 65. The control electrode 79 of second controlled rectifier device 75 is connected to the junction 80 between diode device 72 and inductance 73.

In operation, the time duration limited pulse from shaping and limiting means 24 is applied over the DC decoupling circuit and the blocking diode device 60 to the control electrode 68 of semiconductor controlled rectifier device 65 thereby initiating conduction therein. Upon the initiation of conduction in controlled rectifier device 65, the voltage of the regulated supply is applied across the series combination of diode device 72 and the series resonant circuit provided by inductance 73 and capacitance 74. Current is conducted in the forward direction for a time determined by the resonant frequency of the series-resonant circuit. That is, current is conducted in the forward direction for one-half cycle of the resonant frequency of such series resonant circuit. Since reverse current is blocked by diode device 72, a signal is applied to control electrode 79 of the second controlled rectifier device 75 when the current in the series resonant circuit reverses on the other half-cycle. Since the voltage stored in capacitance 74 is essentially twice the value of the supply voltage and is applied in the forward direction with respect to the second controlled rectifier device 75 providing a forward bias therefor, application of the signal to control electrode 78 is operative to render controlled rectifier device 75 conductive. This results in rendering controlled rectifier device 65 nonconducting since the discharge of capacitance 74 through controlled rectifier device 75 causes a reverse bias to be applied thereto of approximately the same magnitude as that of the supply voltage.

The time between the initiation of conduction in controlled rectifier device 65 and initiation of conduction in the second controlled rectifier device 75 is determined by the natural frequency of the series resonant circuit provided by inductance 73 and capacitance 74. Thus, controlled rectifier device 65 is rendered non-conducting a fixed time after initiation of conduction therein to provide an output on conductors 83 and 37 which has both fixed magnitude and fixed time duration. Since the number of output pulses produced depends upon the number of signaling pulses applied to control electrode 68 of controlled rectifier device 65, the number of which are in turn determined by the number of pulses produced by speed-responsive means 14, the average value of such output pulses is proportional to the angular velocity of toothed wheel 15 and of driveshaft 12 with which it rotates.

*Speed-indicating means*

Since the average value of the output voltage produced by circuit means 25 is proportional to the angular velocity of toothed wheel 15, a visual indication of the speed of the vehicle may be provided by averaging this output and measuring the average value of the current suitably calibrated to indicate vehicle speed. To this end, the output of circuit means 25 is applied over conductors 83 and 37 to the speed-indicating means 28. Speed-indicating means 28 is shown as including a resistance 85 and capacitance 86 connected in series combination across conductors 83 and 37. Shunting capacitance 86 is the series combination of resistance 87, potentiometer 88 and a current measuring device, shown as the milliammeter 90. Resistance 85 and capacitance 86 and resistance 87 and potentiometer 88 provide a filter and calibration adjustment circuit to average the output of circuit means 25 so that the average value of the current read on milliammeter 90 indicates the speed of the vehicle.

*Speed-regulation means*

The system is shown as also providing for speed control of the vehicle between designated limits. This is provided by applying the output of circuit means 25 to the speed-regulation means 30, shown in detail in FIG. 2, wherein such output is applied to a pulse-averaging means to provide an output potential proportional to vehicle speed which output potential is then compared with a reference voltage representative of a preselected vehicle speed. When the output of the pulse-averaging means exceeds the reference voltage, the resulting signal is amplified and utilized in any suitable manner to de-energize the power circuit of the traction motors.

To this end, speed-regulation means 30 includes the winding 92 of a suitable autotransformer 93 which is provided to step-up the voltage from circuit means 25 to assure that sufficient average voltage is present at low vehicle speeds to allow for a proper voltage comparison with the reference voltage. For example, in a particular case, a sufficient average voltage at a vehicle speed of about ten miles per hour was provided by utilizing transformer 93 to step-up the output voltage of circuit means 25 to a peak value of about 100 volts. As shown, the output of circuit means 25 is connected across a portion of winding 92 to the terminals 94 and 95 thereof so that a stepped-up voltage is available at the terminals 95 and 96. A switch 98 having its arm 99 connected to terminal 96 of winding 92 is provided to apply this stepped-up voltage to either all or a selected portion of the voltage divider and filter means 31.

Voltage divider and filter means 31 comprises the series combination of diode device 105, resistances 106, 107 and 108, low-speed potentiometer 109 and high-speed potentiometer 110. One end of the combination is connected to the common conductor 37 and the other end thereof is connected to the contact 112 of switch 98 for connection to terminal 96 of transformer winding 92. The movable tap 114 of low speed potentiometer 109 is connected through filter capacitance 115 to common conductor 37 and over conductor 116 to contact 113 of switch 98. Thus, with switch arm 99 in the position shown, contacting contact 112, the entire series combination of diode 105, resistances 106, 107 and 108 and low and high speed potentiometers 109 and 110 is connected across transformer winding 92. On the other hand, when switch arm 99 is in contact with contact 113, only a portion of such series combination is connected across winding 92. For example, with switch arm 99 contacting switch contact 113, transformer winding 92 is connected across the series combination of resistance 108, high-speed potentiometer 110, resistance 107 and a portion of low speed potentiometer 109. Thus, switch 98 provides for a recalibration of the range of operation.

The output of voltage divider and filter means 31, between movable tap 120 of high-speed potentiometer 110 and common conductor 37, is applied through amplifier 125, shown as comprising a transistor device 126, to the reference voltage means 32. The desired reference voltage is shown as being provided by the series combination of resistance 127 and breakdown diode 128 connected across conductors 46 and 37 to the regulated voltage source through a resistance 129 which biases breakdown diode 128 to the linear region of its current-voltage characteristic. To this end, transistor device 126 has its base electrode 132 connected to movable tap 120 of potentiometer 110, its collector electrode 133 connected through resistance 134 to conductor 46, and its emitter electrode 135 connected through breakdown diode 128 and resistance 127 to common conductor 37.

To prevent class A operation of the system and make it insensitive to normal loop gain variations, additional circuit means are provided, comprising transistor devices 140, 141, 142 and 143 and a feed-back network, to provide switching action in the loop and cause control means 34 to be energized and de-energized at definite vehicle speeds. To this end, the collector electrode 145 of transistor 140 is connected through resistance 146 to conductor 46 and the emitter electrode 147 thereof is connected to common conductor 37 through resistances 127 and 148.

Transistor device 141 has its base electrode 150 connected to collector electrode 133 of transistor device 126, its collector electrode 151 connected through resistance 152 to conductor 46, and its emitter electrode 153 connected to common conductor 37 through breakdown diode 155, suitably biased to the linear region of its current-voltage characteristic by resistance 156 connected between its cathode electrode 157 and conductor 46. Collector electrode 151 of transistor device 141 is also connected through filter capacitance 158 and through breakdown diode 160 and blocking diode 161 to the base electrode 164 of transistor device 142; base electrode 164 being also connected to common conductor 37 through resistance 165. Transistor device 142 has its collector electrode 166 connected through resistance 167 to conductor 46 and its emitter electrode 168 connected to the base electrode 170 of transistor device 143 having an emitter electrode 171 and a collector electrode 172. Collector electrode 172 is connected to conductor 36, and one side of battery 38, through the winding 35 of control means 34 while emitter electrode 171 is connected to common conductor 37. A feed-back signal is coupled from collector electrode 166 of transistor device 142 to the base electrode 174 of transistor device 140 through resistance 175 and blocking diode 176.

In the operation of speed-regulation means 30, therefore, the output of circuit means 25 is applied to the input thereof where by action of auto-transformer 93 it is stepped up to a preselected value, for example, 100 volts peak. This voltage is applied to voltage divider and filter means 31 to provide an output thereat which is proportional to vehicle speed. This voltage is then applied through amplifier 125 to the reference voltage provided by resistance 127 and breakdown diode 128.

Transistor device 126 of amplifier 125, therefore, begins to turn on when the voltage between movable tap 120 of potentiometer 110 and common conductor 37 attains a value exceeding that of the breakdown voltage of breakdown diode 128 plus the voltage across resistance 127. The voltage across resistance 127 is present when transistor device 140 is turned on, by the feed-back signal from the collector electrode 166 of transistor device 142, coupled to the base electrode 174 thereof through resistance 175 and blocking diode 176, and the division of voltage between resistances 146 and 148 in the collector-emitter circuit of transistor device 140. Also, when transistor device 126 of amplifier 125 begins to turn on, transistor device 141 is turned off by operation of breakdown diode 155 in its emitter circuit. This causes the breakdown voltage of breakdown diode 160 to be exceeded causing transistor devices 142 and 143 to be turned on to energize winding 35 of control means 34 from the battery 38. Energization of the winding 35 is operative, such as by causing separation of a pair of contacts associated therewith, to de-energize the power circuit of the traction motors driving the vehicle.

It will be understood by those skilled in the art that the illustrated embodiment of this invention is an example only and that many changes and modifications may be made without departing therefrom. The appended claims, therefore, are intended to cover all such changes and modifications as fall within the true spirit and scope of the invention.

What we claim as new and desire to secure by Letters Patent of the United States is:

1. In a system for providing a signal proportional to speed, the combination comprising: speed-responsive means for producing pulses the rate of occurrence of which is indicative of speed; first circuit means responsive to said speed-indicative pulses for producing output pulses whose time duration does not exceed a predetermined maximum; a DC chopper circuit means responsive to the output pulses from said first circuit means for producing output pulses having a fixed magnitude and time duration; and pulse-averaging means responsive to said fixed magnitude-fixed time duration pulses for providing an output potential proportional to speed.

2. The system of claim 1 wherein said speed-responsive means is of the variable-reluctance type comprising a toothed wheel operating in a magnetic circuit.

3. The system as set forth in claim 1 which further includes a current sensitive meter and calibration resistance means therefor connected to the output of said pulse-averaging means whereby a visual indication is obtained proportional to variable speed voltage signals.

4. Apparatus for deriving a direct current signal proportional to the speed of an object comprising:
(a) speed-responsive means associated with said object for producing output pulses the rate of occurrence of which is indicative of the speed of said object;
(b) first circuit means responsive to said speed-indicative pulses for deriving therefrom signalling pulses having a time duration not exceeding a predetermined maximum,
    said means comprising a saturable magnetic core having first and second windings thereon, means connecting said first winding across the output of said speed-responsive means, means connecting said second winding to a source of voltage to bias said core toward saturation in one direction in the absence of a signal on said first winding, said first winding being operative to saturate said core in the opposite direction when a signal is present thereon thereby shunting down the speed-indicative pulse a predetermined time after its application thereto, and means for amplifying the resulting signal;
(c) a DC chopper circuit;
(d) means applying the signalling pulses from said first circuit means to trigger said DC chopper circuit so that output pulses are produced thereby having a fixed magnitude and time duration and a rate corresponding to the rate of occurrence of said speed-indicative pulses;
(e) pulse-averaging means;
(f) and means connecting the output of said DC chopper circuit to said pulse-averaging means to provide a voltage signal therefrom which is proportional to the speed of said object.

5. The apparatus as set forth in claim 4 which further includes a current sensitive meter and a calibration resistance means therefor connected to the output of said pulse-averaging means whereby a visual indication is obtained proportional to variable speed voltage signals.

6. The apparatus as set forth in claim 4 wherein said pulse-averaging means is a low-pass filter.

7. In a system for controlling the speed of an object, the combination comprising: means operative to vary the speed of said object; speed-responsive means associated with said object for producing pulses the rate of occurrence of which is indicative of the speed of said object; first circuit means for deriving output pulses having a time duration which does not exceed a predetermined maximum from the speed-indicative pulses applied thereto; a DC chopper circuit means responsive to the output pulses of said first circuit means for producing output pulses having a fixed magnitude and time duration; pulse-averaging means responsive to the output pulses of said second circuit means for producing an output voltage signal proportional to the speed of said object; and means applying said output voltage signal to said means for varying the speed of said object.

8. The system as set forth in claim 7 which further includes a second pulse-averaging means connected to the output of said DC chopper circuit means for producing a voltage signal proportional to the speed of said object; a current sensitive meter and a calibration resistance means therefor; and means connecting said speed voltage signal to said current sensitive meter and calibration resistance means whereby a visual indication is obtained proportional to variable speed voltage signals.

9. In a vehicle speed control system of the type wherein propulsion power is removed when the actual speed of said vehicle exceeds an upper limit and is reapplied when the actual speed thereof falls below a lower limit, the combination comprising: speed-responsive means associated with said vehicle operative to generate output pulses the rate of occurrence of which is indicative of vehicle speed; pulse shaping and limiting means for deriving signalling pulses from said speed-indicative pulses, said signalling pulses having a preselected polarity and a time duration not exceeding a predetermined maximum; DC chopped circuit means responsive to said signalling pulses for producing output pulses having a fixed magnitude and time duration; pulse-averaging means connected to average said fixed magnitude-fixed time duration pulses to provide an output voltage proportional to the speed of said vehicle; voltage reference means representative of said upper speed limit; means for comparing the output voltage of said pulse-averaging means with said voltage reference to provide an error signal whenever said output voltage exceeds said reference; control means operative when energized to remove propulsion power from said vehicle and when de-energized to apply propulsion power thereto; and means applying said error signal to said control means operative to cause energization thereof.

10. Apparatus for controlling the energization of a vehicle propulsion system to vary the speed of the vehicle comprising:
   (a) speed-responsive means associated with said vehicle for producing pulses the rate of occurrence of which is indicative of vehicle speed;
   (b) first circuit means operative to derive signaling pulses from said speed-indicating pulses, said signalling pulses having a time duration not exceeding a predetermined maximum;
   (c) a DC chopper circuit means triggered by said signalling pulses and adapted to produce output pulses having a fixed magnitude and time duration and at a rate corresponding to the rate of occurrence of said speed-indicating pulses;
   (d) and speed regulation means responsive to the output of said second circuit means for controlling the energization of said propulsion system to vary the speed of said vehicle,
      said speed regulation means including filter means connected to average the output pulses of said second circuit means and provide an output voltage proportional to vehicle speed, a voltage reference means, means for comparing the output voltage of said filter means with said reference voltage to provide an error signal whenever said filter output voltage exceeds said reference voltage, means for amplifying said error signal, control means for controlling the propulsion power applied to said vehicle, and means applying said amplified error signal to said control means.

11. The apparatus as set forth in claim 10 which further includes a second pulse-averaging means connected to the output of said DC chopper circuit means for producing a voltage signal proportional to the speed of said vehicle; a current sensitive meter and calibration resistance means therefor; and means connecting said speed voltage signal to said current sensitive meter and calibration resistance means whereby a visual indication of the speed of said vehicle is obtained.

References Cited
UNITED STATES PATENTS

| | | | |
|---|---|---|---|
| 3,110,853 | 11/1963 | Jones | 318—318 X |
| 3,201,624 | 8/1965 | Wilkerson | 318—326 X |
| 3,234,447 | 2/1966 | Sauber | 318—345 X |
| 3,247,456 | 4/1966 | Dokter et al. | 318—328 X |

ORIS L. RADER, *Primary Examiner.*

J. J. BAKER, *Assistant Examiner.*